United States Patent [19]

Sengoku

[11] Patent Number: 4,811,125

[45] Date of Patent: Mar. 7, 1989

[54] INFORMATION RECORDING/REGENERATING CIRCUIT FOR A MEMORY UNIT

[75] Inventor: Masaharu Sengoku, Hyogo, Japan

[73] Assignee: Mitsubishi Denki Kabushiki Kaisha, Tokyo, Japan

[21] Appl. No.: 927,091

[22] Filed: Nov. 5, 1986

[30] Foreign Application Priority Data

Jan. 28, 1986 [JP] Japan .................. 61-16375

[51] Int. Cl.$^4$ .................. G11B 5/09; G11B 20/10
[52] U.S. Cl. .................. 360/51; 360/39; 360/53
[58] Field of Search .................. 360/39, 47, 51, 53, 360/54

[56] References Cited

U.S. PATENT DOCUMENTS

| | | | |
|---|---|---|---|
| 4,394,695 | 7/1983 | Mahon | 360/51 |
| 4,590,531 | 5/1986 | Platte et al. | 360/47 |
| 4,594,703 | 6/1986 | Tomisawa et al. | 360/51 |
| 4,625,321 | 11/1986 | Pechar et al. | 360/51 |
| 4,638,472 | 1/1987 | Ogata et al. | 360/53 |
| 4,672,597 | 6/1987 | Yamazaki | 360/51 |

FOREIGN PATENT DOCUMENTS 60-101777 6/1985 Japan .

Primary Examiner—Alan Faber
Assistant Examiner—Surinder Sachar
Attorney, Agent, or Firm—Bernard, Rothwell & Brown

[57] ABSTRACT

A memory unit adapted for use with an electronic computer or the like. In the unit, a data-clock pulse train regenerated by a head is discriminated into a data pulse train and a clock pulse train by a first discrimination circuit in accordance with a first gate signal outputted from a first gate circuit, and any error in each of such discriminated pulse trains is detected by a first regeneration error detection circuit. Meanwhile, the data-clock pulse train is discriminated into a data pulse train and a clock pulse train by a second discrimination circuit in accordance with a second gate signal which is outputted from a second gate circuit in accordance with the regenerated data-clock pulse train and is different in waveform from the first gate signal, and any error in such discriminated pulse trains is detected by a second regeneration error detection circuit, so that any regeneration error in the data-clock pulse train can be detected with a higher precision.

5 Claims, 4 Drawing Sheets

INFORMATION RECORDING/REGENERATING CIRCUIT FOR A MEMORY UNIT

BACKGROUND OF THE INVENTION

1. Field of the Invention

The present invention relates to a memory unit for use in an electronic computer and peripheral or terminal equipment thereof.

2. Description of the Prior Art

Generally in an electronic computer or similar apparatus for processing certain data in accordance with a prepared program, it is usual to employ memory units adapted to store and regenerate, when necessary, incorporated program, data inputted to the apparatus, the result of computation and so forth. Such memory units are classified into a variety of types by some fundamentals concerning an internal type or an external type with respect to installation for the computer, capability of reading out or rewriting the data stored, the kind of recording medium used, and the storage system such as magnetic, electric, chemical or mechanical.

As an example of such various memory units, there is known a magnetic disc device disclosed in Japanese Patent Laid-open No. 60-101777. This magnetic disc device functioning as a conventional memory unit comprises, as shown in FIG. 1, a plate-shaped support base 1, a spindle motor 2 mounted as a rotator on the base 1, a disc 3 set on the spindle motor 2 to serve as a recording medium, a head 4 for reading out data from the disc 3 or writing data thereon while being kept in or out of contact with the storage surface of the disc 3, an arm 5 to which the head 4 is attached via a pressure spring 6 joined to the fore end of the arm, a support mechanism 7 for holding the arm 5 firmly on a driving mechanism (not shown) or a stationary mechanism (not shown), and a cover 8 attached to the base 1 to enclose the above-mentioned members.

The configuration of a recording/regenerating circuit means in the magnetic disc device of such entire constitution will now be described below with reference to a block connection diagram of FIG. 2. In the figure, there are shown a flip-flop circuit 9 responsive to a data-clock pulse train a inputted thereto and inverting an output b from a positive (or negative) logic to a negative (or positive) logic by the rise of such data-clock pulse train a; a current control circuit 10 for converting the output b of the flip-flop circuit 9 into a current c and applying the same as a recording current to the head 4; a regeneration amplifying circuit 11 for amplifying the regenerated output d of the head 4 and feeding an output g to a peak detection circuit 12, which inverts an output f from a positive (or negative) logic to a negative (or positive) logic at the peak of the output e of the regeneration amplifying circuit 11; and a one-shot circuit 13 responsive to the output f of the peak detection circuit 12 and triggered by the rise or fall of the output f to feed a positive logic output g to a voltage-controlled variable frequency oscillation circuit (hereinafter referred to as VFO circuit) 14 and AND circuits 15 and 16 merely during a preset time. The VFO circuit 14 receives the output g of the one-shot circuit 13 and oscillates synchronously with the mean phase of the output g within a predetermined time, and the oscillation frequency of the VFO circuit 14 is controlled by a voltage obtained through conversion of the phase difference between the output of the VFO circuit and the output g, in such a manner that the above phase difference is reduced to zero. The output g of one-shot circuit 13 is delayed for a predetermined time, and complementary outputs h and i of VFO circuit 14 are fed to AND circuits 15 and 16 only during a predetermined period of time. In response to the output g of one-shot circuit 13 and the complementary outputs h and i of VFO circuit 14, AND circuits 15 and 16 produce AND outputs j and k respectively. There is further shown a regeneration error detection circuit 17 which receives the logic product outputs j k of AND circuits 15, 16 and produces an output l after detecting any regeneration error.

FIG. 3 is a waveform chart of signals in the individual circuits of FIG. 2, wherein x and y denote times of clock and data pulses respectively, and t denotes a delay time from the output g to the output h.

Referring now to the operation, when the disc 3 is rotated with the spindle motor 2 driven, a floating force is exerted on the head 4 due to a viscous air stream generated on the surface of the disc 3. Such floating force balances with the pressure of the spring 6 applied to the head 4, so that the disc 3 is rotated while a minute space is maintained between the disc 3 and the head 4. When a train of data and clock pulses x, y and a recording instruction are transmitted from the electronic computer to the magnetic disc device in the state mentioned above, a recording current a is caused to flow in the head 4 by the flip-flop circuit 9 and the current control circuit 10, whereby the data is recorded on the disc 3.

Meanwhile, when a regeneration instruction is transmitted from the electronic computer to the magnetic disc device, the regenerated output d of the head 4 is amplified by the regeneration amplifying circuit 11 and, after the peak is detected by the peak detection circuit 12, the train of clock-data pulses x, y recorded on the disc 3 is restored by the one-shot circuit 13. The AND circuits 15 and 16 produce logic product outputs j, k from the train of data-clock pulses x, y or the output g of one-shot circuit 13 and the complementary outputs h, i of VFO circuit 14, and discriminate between a data pulse train y and a clock pulse train x. During regeneration of the data in the magnetic disc device, the regeneration error detection circuit 17 detects any error in the regenerated data and sends a detection signal ( to the electronic computer, which then keeps transmitting an instruction to repeat such regeneration until elimination of the error, thereby obtaining correct data.

However, there exist the following problems in the conventional magnetic disc device of the above-described structure.

Firstly, dust in the magnetic disc device is prone to enter a minute gap between the head and the disc and, when any external great vibration or shock is applied to the disc device, the floating state of the head with respect to the disc is rendered unstable so that the head is finally brought into contact with the disc, whereby the contact surfaces of both the head and the disc are damaged to eventually cause deterioration of the performance or faults in the magnetic disc device.

Furthermore, in relation to the above problem as well, it may happen that the head falls on the disc to induce trouble in case the damaged head is used for a long time, and the data stored on the disc is thereby spoiled. As a result, the work being executed by utilizing the electronic computer and so forth is brought to a halt to consequently bring about operational and economic loss in business.

SUMMARY OF THE INVENTION

It is an object of the present invention to provide an improved memory unit which is capable of detecting any error in the regenerated data from a memory medium to previously sense any fault based on entrance of dust or other causes, thereby preventing deterioration of the performance or occurrence of such fault.

And another object of the invention resides in providing an improved memory unit which detects any error in the regenerated data from a memory medium to prevent erasure of the stored data, hence averting interruption of work or operational and economic loss that may otherwise be induced in business due to faults.

In order to accomplish the objects above-mentioned, the memory unit according to the present invention is so contrived that a data-clock pulse train regenerated by a head is discriminated into a data pulse train and a clock pulse train and a clock pulse train by a first discrimination circuit in accordance with a first gate signals outputted from a first gate circuit, and any error in the individual pulse trains thus discriminated is detected by a first regeneration error detection circuit. Meanwhile the data-clock pulse train is discriminated into a data pulse train and a clock pulse train by a second discrimination circuit in accordance with a second gate signals which are outputted from a second gate circuit in response to the regenerated data-clock pulse train and have waveforms differing in phase from that of the aforesaid first gate signal, and any error in the individual pulse trains discriminated by the second discrimination circuit to sense unstable operation of the memory unit is detected by a second regeneration error detection circuit.

DETAILED DESCRIPTION OF THE PREFERRED EMBODIMENTS

Hereinafter a preferred embodiment of a memory unit according to the present invention will be described in detail with reference to the accompanying drawings.

Figure 1:
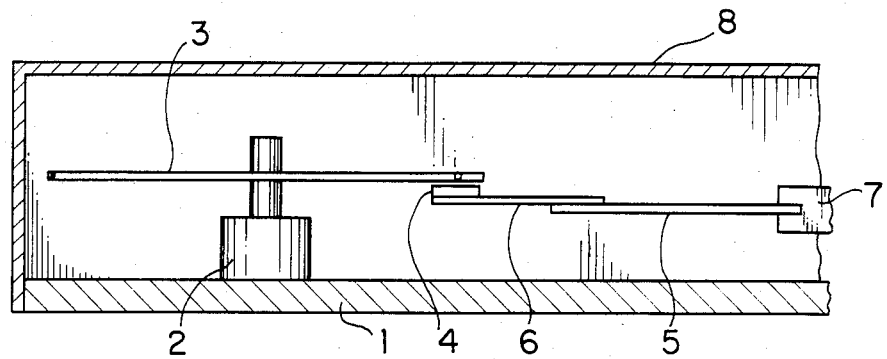
FIG. 1 is a partially sectional schematic view of an exemplary disc device serving as a memory unit.
Figure 2:
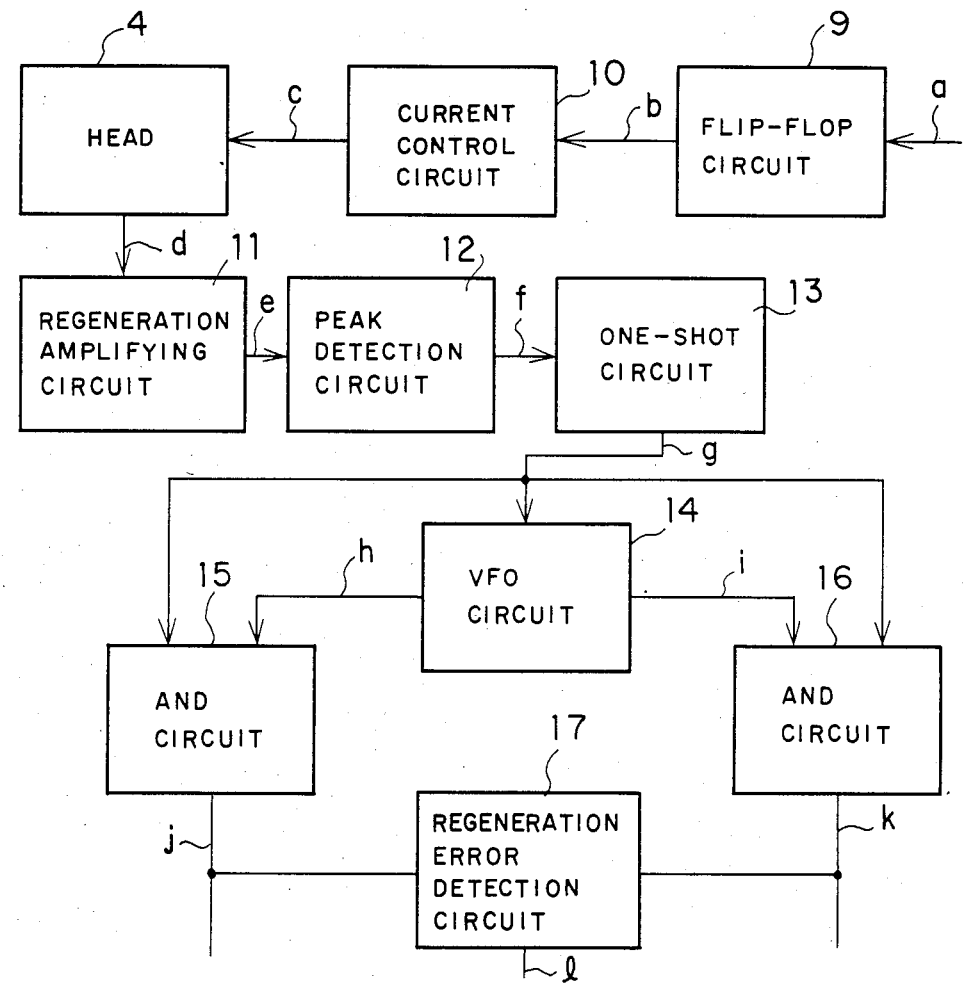
FIG. 2 is a block connection diagram schematically showing the constitution of a recording/regenerating circuit means in a conventional memory unit.
Figure 3:
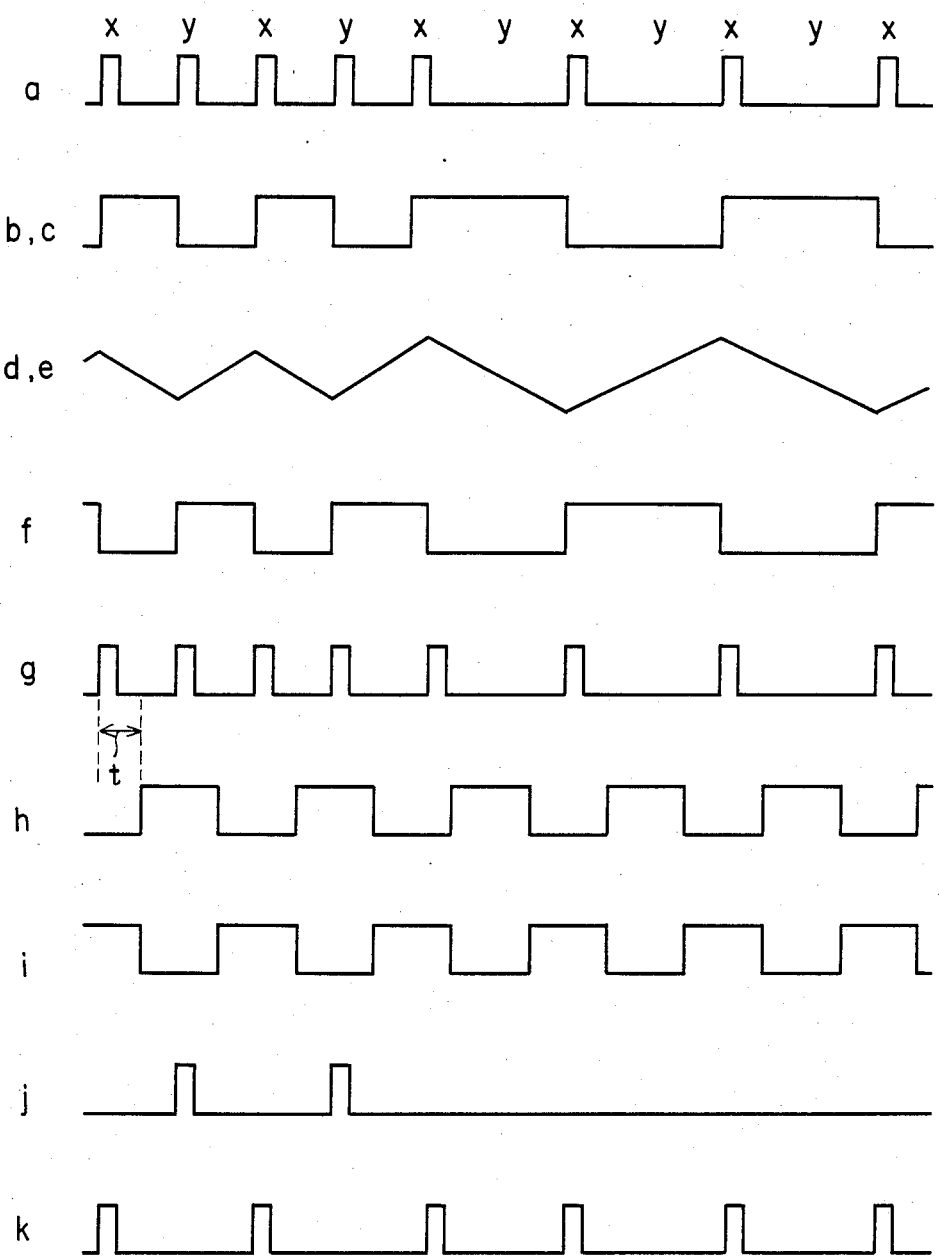
FIG. 3 is a timing chart showing waveforms of output signals obtained from individual circuits of the circuit means in FIG. 2.
Figure 4:
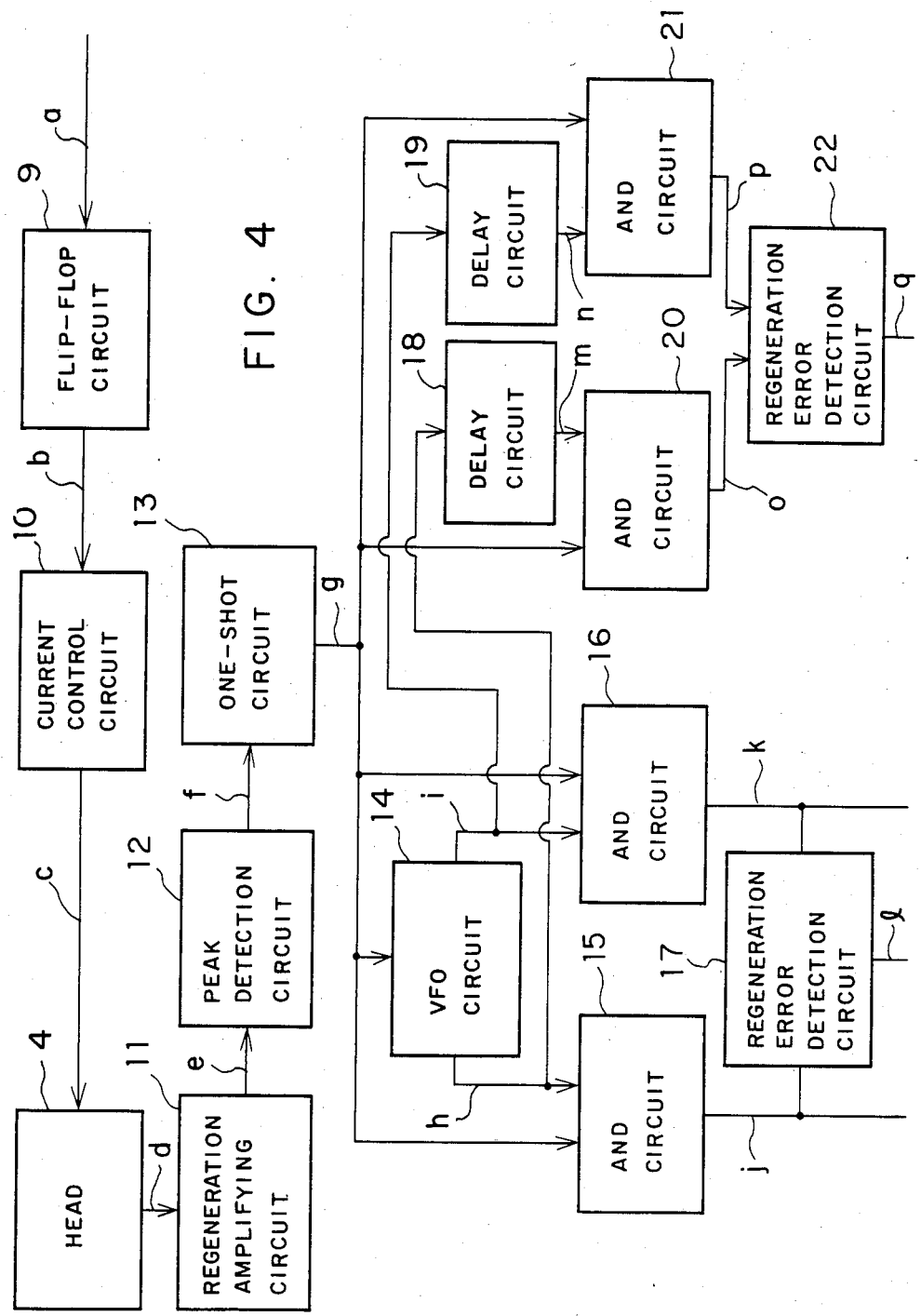
FIG. 4 is a block connection diagram schematically showing the constitution of a recording/regenerating circuit means in the memory unit of the present invention.

FIG. 4 is a block connection diagram of an example where the invention is applied to a recording-/regenerating circuit means in a disc device, wherein component elements denoted by reference numerals 4 and 9 through 17 correspond to those designated by the same numerals in FIG. 2, and a repeated explanation thereof is omitted here. In FIG. 4, delay circuits 18, 19 serving as a second gate circuit are connected to the output side of the VFO circuit 14 serving as a first gate circuit. The delay circuits 18, 19 function to delay complementary outputs h, i of the VFO circuit 14 for a predetermined time u and feed outputs m, n of a predetermined duration respectively to AND circuits 20, 21 serving as a second discrimination circuit.

The AND circuits 20, 21 receive both an output g of a one-shot circuit 13 and outputs m, n of delay circuits 18, 19 and produce AND outputs j, k. Denoted by 22 is a second regeneration error detection circuit which produces an output q by detecting any regeneration error in the AND outputs o, p of the AND circuits 20, 21 received.

Figure 5:
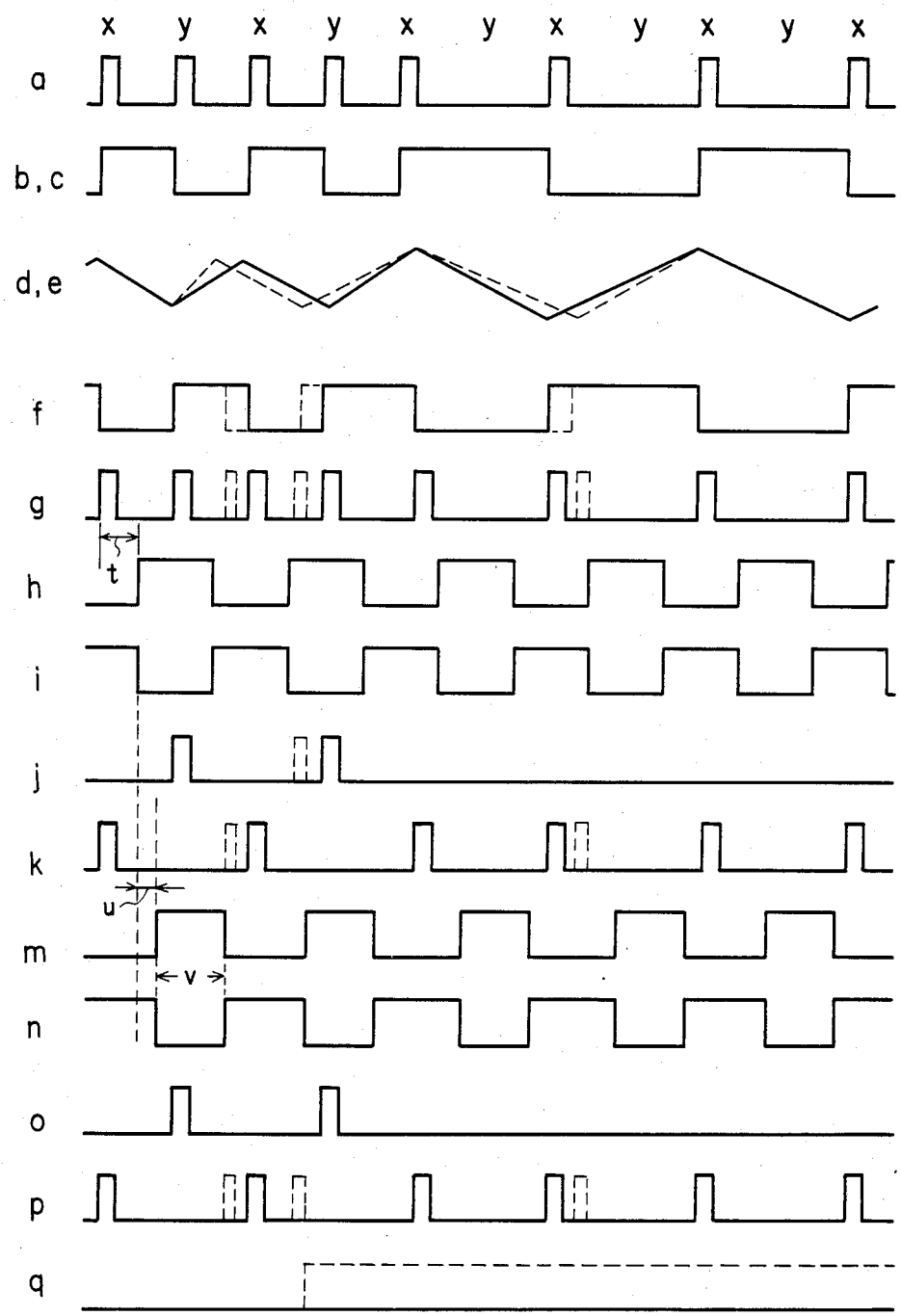
FIG. 5 is a timing chart showing waveforms of output signals obtained from individual circuits of the circuit means in FIG. 4.

FIG. 5 is a timing chart of output signals produced from the individual circuits of the circuit means shown in FIG. 4, wherein reference symbols a–k, t, x and y denote those represented by the same symbols in the foregoing figures.

In FIG. 5, u denotes a delay time added to the aforesaid delay time t from the complementary outputs h, i of the VFO circuit 14 to the outputs m, n of the delay circuits 18, 19; and q denotes a duration of each of the outputs j, k of the delay circuits 18, 19.

Solid lines represent waveforms obtained when the component members such as head 4, disc 3 and so forth function normally.

Meanwhile, dotted lines represent waveforms obtained when the floating state of the head 4 is rendered unstable and consequently the head 4 or the disc 3 begins to be damaged or when the head 4, disc 3 or some other electric circuit element begins to malfunction due to gradual deterioration of the performance thereof.

In such magnetic disc device, the operation is performed in the following manner. When the head 4, disc 3 and other component members function properly, as shown by solid lines, there is no phase variation in the train of data-clock pulses x, y or the output g of the one-shot circuit 13, so that the data-clock pulses x, y are discriminated properly into a data pulse train y and a clock pulse train x by the outputs o, p of the AND circuits 20, 21 in accordance with the outputs m, n of the delay circuits 18, 19, whereby an output q of the second regeneration error detection circuit 22 is not produced.

However, in case the head 4, disc 3 or any other component member begins to malfunction, as shown by dotted lines, there occurs a phase variation in the train of data-clock pulses x, y or the output g of the one-shot circuit 13, so that the data-clock pulses x, y are discriminated erroneously into a data pulse train y and a clock pulse train x by the outputs o, p of the AND circuits 20, 21 in accordance with the outputs m, n of the delay circuits 18, 19, whereby an output q of the regeneration error detection circuit 22 is produced.

When the output g of the regeneration error detection circuit 22 is fed into the electronic computer, the computer immediately transmits an instruction to the magnetic disc device so that, before the head 4 falls on the disc 3 or any component member is damaged due to some other reason, the data is regenerated from the disc 3 and then is stored in another memory unit, thereby preventing accidental erasure of the stored data and executing preventive maintenance to avert a long-time interruption of the work or occurrence of various losses.

In the above embodiment, a VFO circuit is employed for producing first and second gate signals to discriminate the data-clock pulse train. However, similar effect is also achievable by the use of some other suitable circuit such as a one-shot circuit which produces a variable pulse output.

The present invention is not limited to the above embodiment where the delay time u of second gate signals m, n outputted from the delay circuits 18, 19 is added to the delay time t of first gate signals h, i. And the configuration may be so modified as to subtract the delay time u from the delay time t and thereby produce second gate signals m, n which are different in phase from the first gate signals h, i. The above example is so constituted that the second gate signals j, k are obtained as the outputs of delay circuits 18, 19 serving as a second gate circuit on the basis of the first gate signals h, i outputted from the VFO circuit 14 which serves as a first gate circuit. However, the configuration is not limited to the above alone, and the second gate signals m, n may be formed directly on the basis of the data-clock pulse train, which is the output g of the one-shot circuit 13, without being processed through the VFO circuit 14. In addition to the above where the second gate signals m, n are obtained as delayed ones from the first gate signals h, i, the invention may be so modified as to form second gate signals, which are different in waveform from the first gate signals, by widening or narrowing the duration of the second gate signals or the data-clock pulses.

Although an electric circuit is employed in the above embodiment as the second regeneration error detection circuit 22, similar effect is attainable by the use of a microcomputer or the like as the second regeneration error detection circuit 22 controllable by firmware for detecting occurrence of any error in the signal discrimination. Furthermore, besides the above embodiment where each signal is outputted in accordance with the data-clock pulse train shown in FIG. 5, the pulse train may be the one processed by any suitable modulation/demodulation system other than the example of FIG. 5.

The magnetic disc device described above as an example may be replaced with any other type using magnetic tape, flexible disc or magnetic drum, or with any other memory device such as audio or video recorder of optical, photomagnetic, laser, electric field or electric charge type, and still a similar effect is achievable as in the foregoing embodiment.

The above description is concerned with the case of applying the present invention to a memory unit in a narrow sense. However, the invention is not limited to such example alone and may be applied to any memory unit in a broad sense for use in controller, electronic computer system or software system. And it is possible to achieve an effect similar to that in the foregoing embodiment.

As described in detail hereinabove, the memory unit of the present invention ensures the following advantageous effects.

Due to the arrangement where any error in the regenerated signal is detected in accordance with a second gate signal which is different in waveform from a first gate signal serving to discriminate the regenerated train of data-clock pulses into a data pulse train and a clock pulse train, it becomes possible to previously find any malfunction that results from entrance of dust or various causes as well as deterioration in the performance of the regeneration circuit means and so forth, thereby preventing occurrence of faults.

And owing to such capability of preventing faults, the memory unit retains high reliability in averting interruption of the work that may otherwise be induced by such faults and also in eliminating operational and economic loss in business.

What is claimed is:

1. A memory unit comprising: a head disposed opposite to a recording face of a rotatable recording medium and functioning to record and/or regenerate a data-clock pulse train;
    a first gate signal generating circuit for producing a pair of first gate signals to discriminate the data-clock pulse train regenerated by said head into a data pulse train and a clock train;
    a first discrimination circuit for discriminating said data-clock pulse train into a data pulse train and a clock pulse train in accordance with said respective pair of first gate signals outputted from said first gate signal generating circuit;
    a first regeneration error detection circuit for detecting any error in said data pulse train and said clock pulse train to sensor a failure of the memory unit;
    a second gate signal generating circuit for producing a pair of second gate signals in accordance with said regenerated data-clock pulse train, said second gate signals being different in phase from said first gate signals;
    a second discrimination circuit for discriminating, in accordance with said second gate signals outputted from said second gate signal generating circuit, said data-clock pulse train regenerated by said head into a data pulse train and a clock pulse train; and
    a second regeneration error detection circuit for detecting any error in each of said pulse trains discriminated by said second discrimination circuit to sense unstable operation of the memory unit.

2. The memory unit as defined in claim 1, wherein said first gate signal generating circuit is composed of a voltage-controlled variable frequency oscillation (VFO) circuit, and said second gate signal generating circuit is composed of a delay circuit which produces the second gate signals delayed for a fixed time from the first gate signals outputted from said VFO circuit.

3. The memory unit as defined in claim 1, wherein said first and second discrimination circuits are each composed of two AND circuits having inputs controlled by the respective pair of first and second gate signals to discriminate the data-clock pulse train regenerated by said head into a data pulse train and a clock pulse train.

4. The memory unit as defined in claim 1, wherein said second regeneration error detection circuit is composed of an integrated circuit controllable by firmware and having a computing function.

5. The memory unit as defined in claim 1, wherein said second regeneration error detection circuit is so formed as to produce a detection control signal which enables said head to be operated to regenerate the data recorded on said recording medium and so that the regenerated data can be stored in another memory unit.

* * * * *

UNITED STATES PATENT AND TRADEMARK OFFICE
CERTIFICATE OF CORRECTION

PATENT NO. : 4,811,125

DATED : March 7, 1989

INVENTOR(S) : Masaharu Sengoku

It is certified that error appears in the above-identified patent and that said Letters Patent is hereby corrected as shown below:

Column 1, line 52, "g" should be --e--.

Column 2, line 10, "jk" should be --j, k--;

line 11, "1" should be --$\ell$--;

line 27, "a" should be --c--;

line 44, "(" should be --$\ell$--.

Column 3, line 60, after "recording" delete the hyphen "-".

Column 4, line 7, "j, k" should be --o, p--;

line 20, "q" should be --v--;

line 21, "j, k" should be --m, n--.

Column 5, line 11, "j, k" should be --m, n--.

Column 6, line 24, "sensor" should be --sense--.

Signed and Sealed this

Twenty-fifth Day of December, 1990

*Attest:*

HARRY F. MANBECK, JR.

*Attesting Officer*  *Commissioner of Patents and Trademarks*